US008078146B2

(12) United States Patent
Jayappa et al.

(10) Patent No.: US 8,078,146 B2
(45) Date of Patent: Dec. 13, 2011

(54) SYSTEMS AND METHODS FOR SECURITY AND ASSET MANAGEMENT

(75) Inventors: Mahesh N. Jayappa, Bangalore (IN); Marine Drive, Bangalore (IN); Mayur Salgar, Bangalore (IN); Deepakumar Subbian, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 593 days.

(21) Appl. No.: 11/756,901

(22) Filed: Jun. 1, 2007

(65) Prior Publication Data

US 2008/0299946 A1 Dec. 4, 2008

(51) Int. Cl.
*H04M 1/66* (2006.01)

(52) U.S. Cl. .................. 455/411; 455/404.1; 455/404.2; 455/410; 455/41.2; 455/41.3; 340/506; 340/10.52; 340/545.2; 340/5.31; 340/5.8; 340/10.4; 340/12.52; 340/12.51

(58) Field of Classification Search .................. 455/410, 455/404.1, 404.2, 411, 41.2, 41.3; 340/506, 340/541, 542, 545.2, 5.2, 5.21, 5.31, 5.8, 340/10.52, 12.51, 12.52, 13.22, 13.24, 13.26, 340/572.1
See application file for complete search history.

(56) References Cited

U.S. PATENT DOCUMENTS 5,895,436 A 4/1999 Savoie et al.
6,069,411 A 5/2000 Charron
6,148,190 A * 11/2000 Bugnon et al. ............. 455/404.1
6,356,638 B1 * 3/2002 Hardy et al. .................. 380/275
6,624,739 B1 9/2003 Stobbe
6,636,742 B1 * 10/2003 Torkki et al. ............... 455/456.1
6,675,015 B1 * 1/2004 Martini et al. ................ 455/436
6,745,037 B1 6/2004 Neumann et al.
6,850,761 B2 * 2/2005 Pallonen ....................... 455/437
6,895,241 B2 * 5/2005 Hara ............................. 455/420
6,957,342 B2 * 10/2005 Vatanen ........................ 713/192
7,114,178 B2 * 9/2006 Dent et al. ........................ 726/6
7,269,846 B2 * 9/2007 Chennakeshu et al. ........... 726/4
7,616,113 B2 * 11/2009 Ayachitula et al. ...... 340/539.13
7,706,778 B2 * 4/2010 Lowe ............................ 455/411
2002/0070273 A1 6/2002 Fujll
2003/0071126 A1 * 4/2003 Waxelbaum ............. 235/462.25
2005/0110610 A1 * 5/2005 Bazakos et al. .............. 340/5.82
2005/0143051 A1 6/2005 Park
2005/0218215 A1 * 10/2005 Lauden ......................... 235/380
2007/0270164 A1 * 11/2007 Maier et al. ................ 455/456.2

FOREIGN PATENT DOCUMENTS

EP 1 424 861 6/2004
FR 2 861 943 5/2005
GB 2417858 3/2006
GB 2 417 858 A 8/2006
WO WO 00/38119 6/2000

OTHER PUBLICATIONS

European Search Report, mailed Jun. 29, 2009 corresponding to European application No. EP 08 15 7401.

* cited by examiner

*Primary Examiner* — Olumide T Ajibade Akonai
(74) *Attorney, Agent, or Firm* — Husch Blackwell

(57) ABSTRACT

This invention relates to using consumer devices, such as mobile telephones, to identify, authenticate, locate and contact users of security and asset management systems. Such consumer devices can be used not only with the security systems but also for other uses. A device is initially registered with the security system. As needed, the device is presented to the system for authentication, enabling a person access to a secure area. In addition, the system can determine the person's location in the secure area and can send information messages to the person as well as notifying the person in case of emergency.

21 Claims, 4 Drawing Sheets

SYSTEMS AND METHODS FOR SECURITY AND ASSET MANAGEMENT

FIELD OF THE INVENTION

This invention relates generally to security and asset management systems. In particular, this invention relates to using consumer devices such as mobile telephones to identify and authenticate, as well as to locate and contact, users of security and asset management systems.

BACKGROUND OF THE INVENTION

Security and asset management systems are used to monitor homes and businesses to prevent unwanted intrusions as well as to guard against natural disasters. Such systems control entry and egress to structures as well as areas within the structures. In early security systems, keys were required for entry into protected buildings. In more recent systems, however, access is attained using identity devices which interact with an access control device, such as a reader, operating in conjunction with a control panel which permits or denies access to users based on identification or authorization. These systems generally employ either a passive device, like a proximity card, or an active device, like an RFID tag, to identify and/or authenticate users of the system. A user can present his or her device to an access control device, and the user's device can initiate the authentication procedure. In the alternative, an access control device can initiate authorization or entry verification by searching for a valid user device.

An access control device which searches for a valid user device is disclosed in UK Patent Application 2,417,858, Access Control Device Using Mobile Phones for Automatic Wireless Access with Secure Codes and Biometrics Data. This application discloses an access control device that uses an automatic process of authentication based on secret encrypted codes determined with a rolling time-based encryption algorithm. In at least one embodiment, automatic search and detection of credentials from an authorized user carrying a mobile telephone having a valid access code is performed by a dedicated Subscriber Identity Module (SIM) in the entry access controller. In another embodiment, user credentials are passed from a user's mobile telephone as short message service (SMS) to the SIM of the entry access controller via standard communication channels such as Bluetooth® telecommunication services. This system requires usage of a dedicated SIM card at the controller to implement the encryption algorithm and store encrypted codes.

U.S. Patent Application Publication No. 2005/0143051, Mobile Authentication/Financial Transaction System Using a Unique Mobile Identification Code and Method Thereof discloses a mobile authentication and financial transaction system using a unique mobile identification code wherein admission control and/or a variety of financial transactions are performed on the basis of call information transmitted by a mobile communication terminal. The unique identification code can be a "peculiar mobile identity code" or a combination of the registered telephone number and an electronic serial number. All embodiments disclosed in this application use mobile frequency and the telecommunication system for communication.

U.S. Pat. No. 5,895,436, Vehicle Tracking System Using Cellular Network, discloses a vehicle tracking system that uses existing cellular network infrastructure. A locating cellular transceiver is placed in a vehicle and the transceiver's Electronic Serial Number (ESN) is registered. If the vehicle is stolen, the ESN is used to determine the general location of the vehicle; its precise location is established using a radio direction finder which is tuned to the voice channel of the cellular transceiver. Thus, a cellular network of a telecommunication system or paging system is necessary to identify and to track vehicles.

U.S. Pat. No. 6,624,739, Access Control System, discloses a mobile transponder with an authorization code for providing access to the user. The system provides access based on a comparison of a person's biometric characteristics with biometric data stored in memory. However, it does not overcome the problem of requiring a special device, the mobile transponder, for identification and/or authorization. Further, the transponder does not allow identification and/or authentication of the user for emergency situations.

U.S. Pat. No. 6,069,411, Anti-Theft Method for a Vehicle Using a Portable Telephone, discloses using the International Mobile Equipment Identification (IMEI) of a mobile telephone as an element of a vehicle anti-theft method. To start a vehicle, a user puts his portable telephone into a fastener element. The telephone then compares its ESN or IMEI number with the one that is stored at a location in the fastener element. If the numbers match, the vehicle can be started. However, all processing or matching or authentication is performed in the telephone using the fastener element only as a conduit. Further, the mobile telephone must initiate identification or authorization of a user; the fastener element cannot search for an identification device.

Among the problems of the aforementioned systems are the necessity for telecommunication systems for communication, and specific devices, such as SIM cards built into the control apparatus. If devices other than mobile telephones are used as user identifiers, the devices, such as RFID tags, have range and battery life limitations, and also have extra costs for maintenance. Further, a user of the security system must produce his or her specific identity device, such as an apparatus containing an RFID tag, to be identified or authenticated, necessitating that the user carry the identity device with him or her. In addition, these devices generally are not operable in case of an emergency, either for the system to identify and communicate with the user, or for the user to communicate with the system.

SUMMARY OF THE INVENTION

The present invention advantageously provides a security and asset management system accessible using consumer devices, such as mobile telephones, to identify, authenticate, locate and contact security system users. Such consumer devices can be used not only with the security system but also for other uses. A device is initially registered with the security system not merely one specific access point. As needed, the device is presented to the system for authentication, enabling a person access to a secure area. In addition, the system can determine and store the person's location in the secure area and can notify the person in case of emergency.

The security and asset management system includes a device operable for mobile communication, said device having an id code and a device communication interface operable to initiate transmission of the id code and to respond to a request for transmission of the id code. The system further comprises at least one reader having a reader communication interface operable to obtain the id code from the device; a control panel operable to communicate with said at least one reader; and a memory, accessible via the control panel, for storing location data and ID data comprising at least one or more id codes, wherein the control panel validates the id code received from said reader, and the control panel stores a device location determined using the location data and a signal received from the device.

In one embodiment, the reader requests the id code from the device, while in another embodiment, the device transmits its id code without receiving a request from the reader. In another embodiment, the device has a security module for encrypting the id code and the reader has a security module for decrypting the id code.

The foregoing and other objects, aspects, features, advantages of the invention will become more apparent from the following description and from the claims.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings As should be understood, however, the invention is not limited to the precise arrangements and instrumentalities shown. In the drawings.

DETAILED DESCRIPTION OF THE INVENTION

An inventive solution is presented to the need for a security and asset management system ("security system") operable with a device which can be used to identify, authenticate, locate and contact its user, such that the device can be used not only with the security system but also has functionality separate from the security system, that is, a device such as a mobile telephone.

Figure 1:
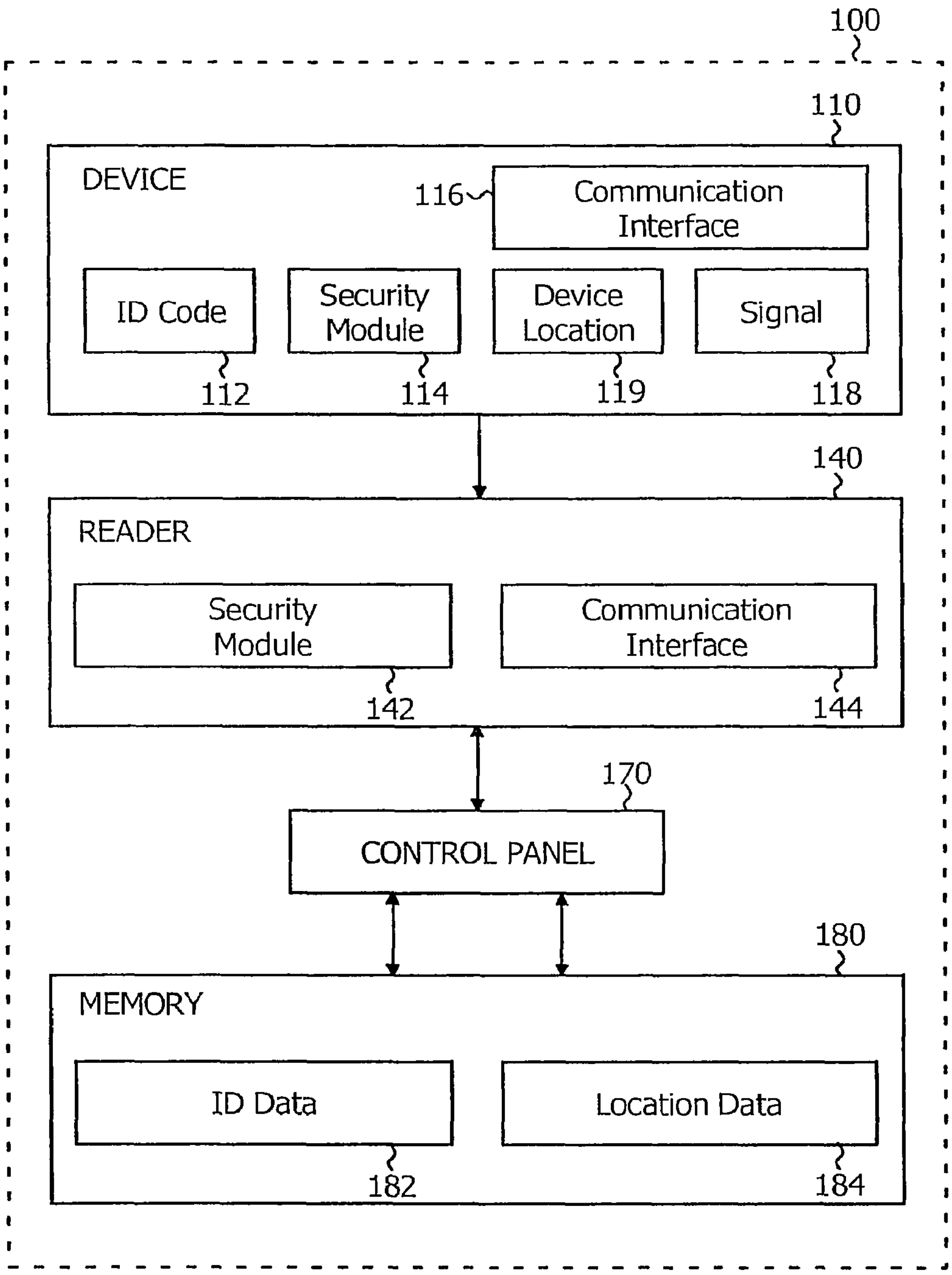
FIG. 1 is a block diagram of an exemplary embodiment of the present invention.

FIG. 1 shows an exemplary security system 100. The security system 100 can include an authentication and identification device 110, an access device or reader 140, a control panel 170, and a memory 180. The device 110 can include an id code 112, a security module 114, and a communication interface 116. The id code 112 is initially registered and stored in the security system's identification and authorization (ID) data 182 which resides in the system's memory 180. The device 110 can also transmit a signal 118 from which its location, e.g. device location 119, can be determined. The device has the ability not only to transmit a signal and transmit its id code, but also has functionality to act as a mobile communication device, a calculator, a processor, an electronic organizer, and the like. Such devices may include, but are not limited to, mobile devices such as cellular phones, smart phones, laptops, PDAs (personal digital assistants) and the like. The device's optional security module 114 provides secure communication, such as encryption and decryption.

The reader 140 can include a security module 142, and a communication interface 144 enabling communication between the reader and the device 110 as well as between the reader and the control panel 170 of the security system. The communication interface of the reader 140 and the device 116 may include, but is not limited to, Infrared (IR), Bluetooth® telecommunication services, 2.4 GHz Frequency (Unlicensed Frequency Band), GSM/GPRS/CDMA Frequencies, and RDID/Smart Cart/Proximity Card Frequencies. To avoid overloading and dependencies, mobile frequencies or cellular networks are generally not used for secure communication. The security module 142, like the device's security module 114, enables secure communication. The reader 140 may have the electronic circuitry which can query the mobile telephone 110 for its id code 112. The mobile telephone will have a communication interface 116 to transmit the id code 112 to the reader 140.

The reader 140 communicates with the control panel 170 which provides access to the security system's memory 180 which contains information including ID data 182, including id codes from multiple devices, and location data 184. As shown in FIG. 1, the ID data 182 is stored separately from the control panel 170 and the reader 140, which enhances the security of the security system and allows user access via multiple readers as discussed below. In addition, the location data 184 describing and locating rooms and other areas protected by the security system 100 is stored in the system's memory 180 and accessed through the control panel 170. The ID data 182 can reside in the same memory as the location data 184 or each can reside in separate memory (not shown).

Figure 2:
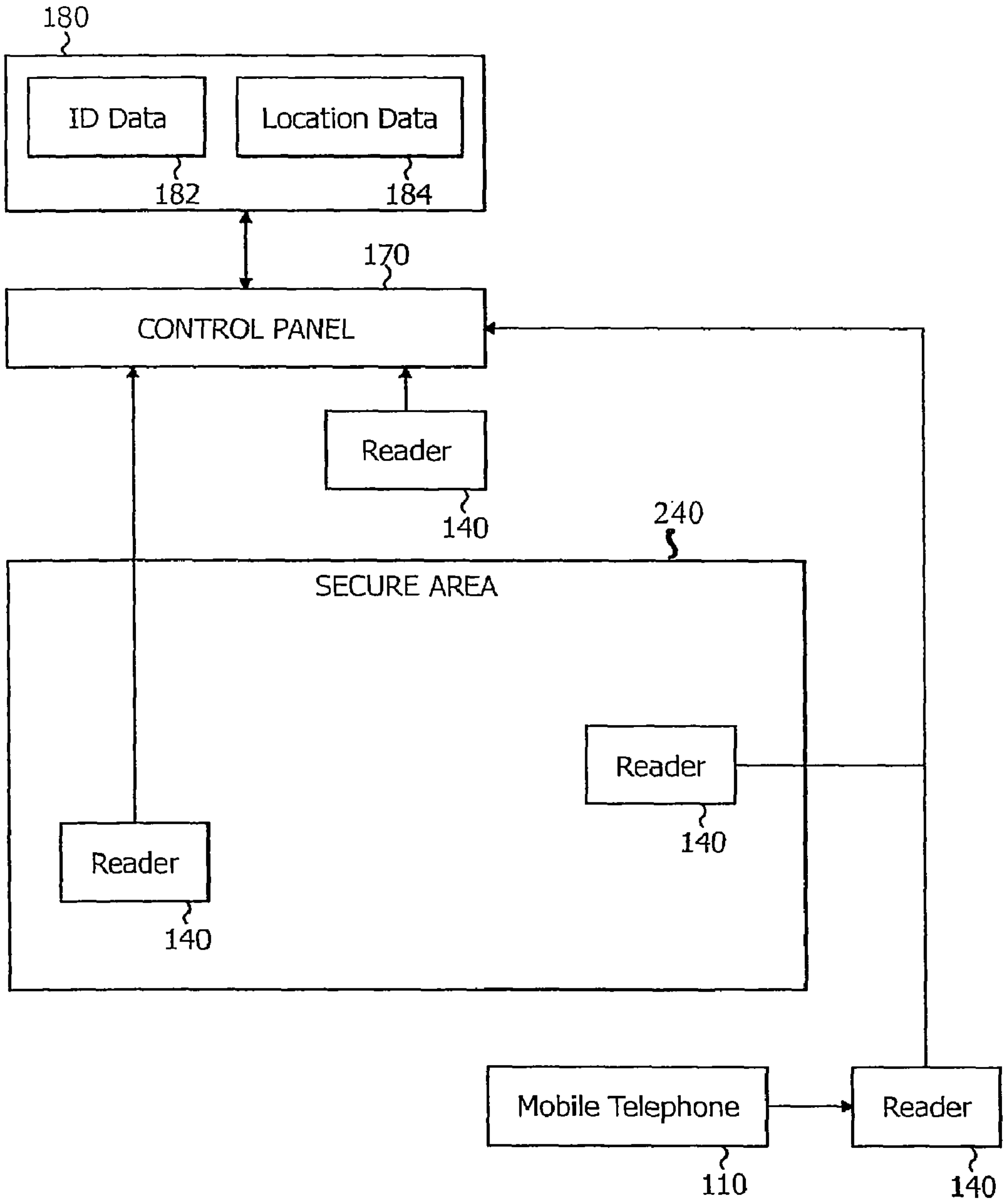
FIG. 2 is a block diagram of a secure area in accordance with one embodiment of the present invention.

In a preferred embodiment shown in FIG. 2, the mobile telephone 110 is a user's identification, authentication and/or location device. As is known in the art, any mobile telephone can be uniquely identified by its IMEI, or its ESN. Thus a mobile telephone 110 can become a user's identification, authentication, and/or location device by using its IMEI as the unique id code 112 by registering or enrolling the IMEI in an existing security system. Generally registration of the IMEI code with the security system is performed only once.

FIG. 2 shows a Secure Area 240, access to which is controlled by a security and asset management system. The secure area 240 may be one structure or a predetermined group of structures or buildings. When a user of a mobile telephone 110 wants to enter into the secure area 240, the user must be identified. Entry is permitted only if the user's IMEI is integrated into or registered with the security system, and the user is authorized by the security system to enter. In addition, a user may need authorization to move from one place to another, for example, from building to building, floor to floor or room to room, within the secure area. Thus, as shown in FIG. 2, readers 140 can be located both inside and outside the secure area 240. The reader receives the IMEI of the user's mobile telephone, and transmits this IMEI to the control panel which determines whether the user is authorized to enter. If the control panel 170, based on the ID data 182 in the security system, determines that the IMEI is valid and authentic, the user is authorized, and permitted to enter the secure area 240. Because all of the readers can obtain access to the security system ID data 182 through the control panel 170, this data is stored only once in a secure location, not stored in each reader's memory. In one embodiment, when the person is authorized to enter, the control panel can perform a task such as opening a door or gate.

The system can be either active or passive. In the passive system, identification, authentication and/or location of the user's mobile telephone can be performed non-intrusively by the security system readers 140. Each reader 140 scans the area to obtain the id code 112, for example, the IMEI, from the mobile telephone. The passive system can employ the communication interfaces of Bluetooth® telecommunication services, 2.4 GHz Frequency, and GSM/GPRS/CDMA Frequencies. IR and Proximity Card Frequency communication interfaces, which each require line of sight, generally would not be used in the passive system. The protocol of communication between the reader and the mobile telephone will involve a method for scanning by the reader for any valid source (e.g., mobile telephone) containing an IMEI within a particular distance range. As discussed above, the reader shall scan and automatically identify and authenticate the user in conjunction with the control panel.

In the active system, the user must interact or initiate authorization. The user communicates the IMEI to the reader either by pressing a button (for example, the star (*) button) on his mobile telephone, or by presenting the mobile telephone near the reader. The protocol of communication between the mobile telephone and the reader shall involve getting the IMEI, validating or authenticating it in conjunction with the control panel, and talking the appropriate action. The active system supports all the communication interfaces mentioned above, including IR and Proximity Card Frequency.

In addition, the readers 140 can determine the direction and distance of the received signal 118 of the user's mobile telephone 110, and forward this signal 118 along with the IMEI to the control panel 170. Either the readers 140 can query the user's mobile telephone 110 to obtain its signal 118, or a user can supply the signal without being asked. The user's location 119 within the secure area or structure 240, for example, the floor or room occupied by the user, can be established by coordinating the signal 118 with the location data 184 of the security system available to the control panel 170. The reader could transmit a message through the user's device. The message could be sent by the reader whether or not the user is authenticated by the control panel for the particular reader. This could be used, for example, to inform a user that he is only permitted on the main floor of the building, and could also be used in emergency situations like "locate a doctor" or "find a person in case of a fire", etc.

Moreover, as described above, the person can provide his position or device location 119 to the nearest reader 140. Thus, the user can alert the reader to an emergency situation by sending a signal with a request for assistance, for example, emergency paging, along with his IMEI number. The security system 100 will identify the user emergency and initiate appropriate actions.

Figure 3:
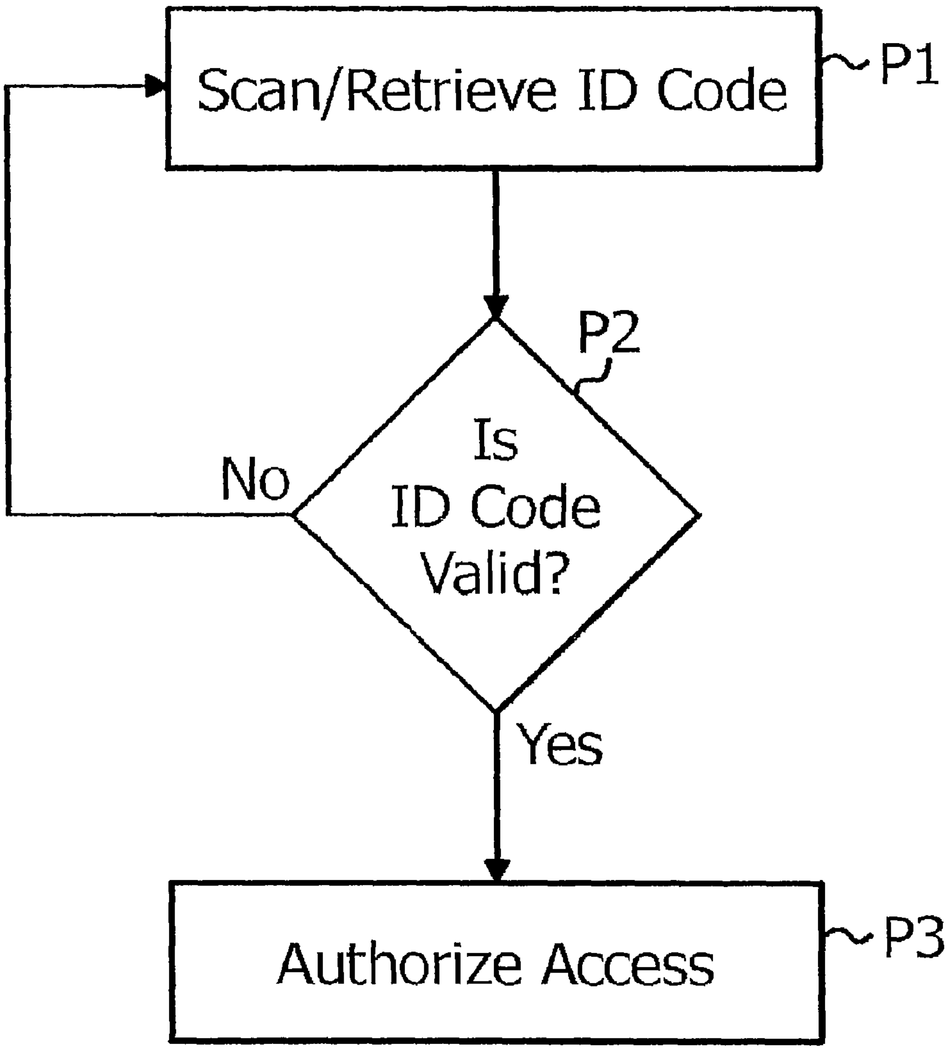
FIG. 3 is a flow diagram illustrating the steps for one embodiment of the present invention.

Operation of both the active and passive security systems are now described with reference to FIGS. 3 and 4. In the passive system shown in FIG. 3, in P1 the reader scans the area and obtains the IMBI from a mobile telephone. In P2 the reader communicates with the control panel to validate the IMEI. If the IMEI is valid, authentication is performed in P3. If the IMEI is not valid, the reader again scans the area in P1.

Figure 4:
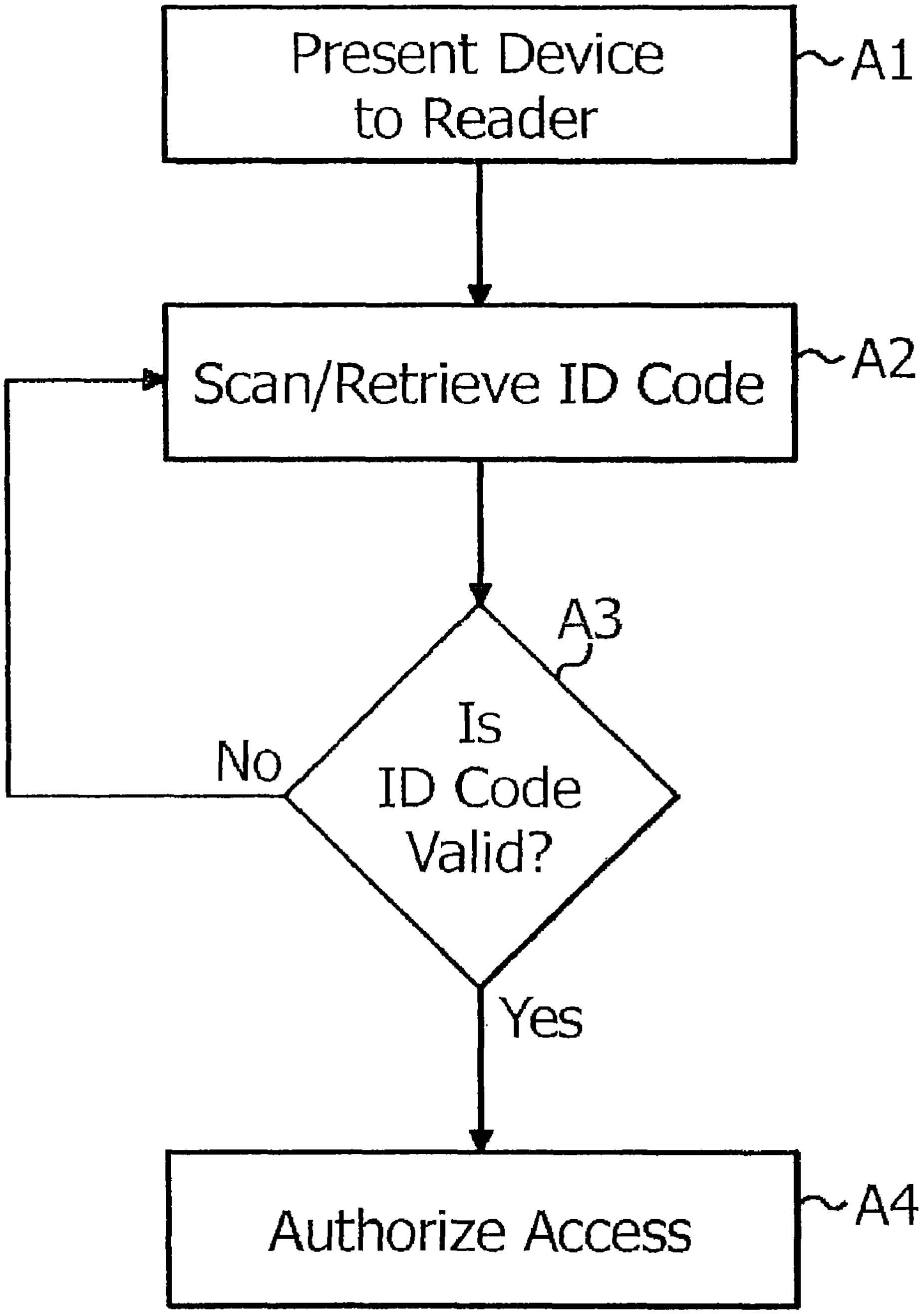
FIG. 4 is a flow diagram illustrating the steps for another embodiment of the present invention.

In the active system shown in FIG. 4, in A1 a user presents a mobile telephone to the reader. The reader obtains the IMEI from the mobile telephone in A2. In A3 the reader communicates with the control panel to validate the IMEI. If the IMEI is valid, authentication is performed by the control panel in A4. If the IMEI is not valid, the reader waits for a user to present a mobile telephone in A1.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A security and asset management system (100) that controls access to a secure area (240) having a device (110) operable for mobile communication, said device (110) having an id code (112) and a device communication interface (116) operable to initiate transmission of the id code (112) and to respond to a request for transmission of the id code (112), said system (100) comprising:

a plurality of readers (140) each having a reader communication interface (144) operable to obtain the id code (112) from the device via a predetermined frequency band wherein mobile frequencies or cellular networks are not used for secure communications and wherein each of the plurality of readers (140) is operable to determine a direction and distance of the device (110) from the reader (140);

a control panel (170) operable to communicate with said at least one reader (140); and a memory (180) for storing location data (184) and ID data (182) separate from the control panel (170), the memory (180) including at least one or more id codes (112), said memory (180) accessible by said control panel (170), wherein the control panel (170) validates the id code (112) received from said reader (140), and the control panel (170) determines a device location (119) within a room or floor or the secure area by coordinating the location data (184) from the memory (180) with the determined direction and distance of the device (110) from the reader (140) wherein said control panel (170) permits entry by a user of the device (110) into the secure area (240) via any of the plurality of readers (140) based upon the validated id code (112) and determined location and sends messages to a user of the device (110) through one of the plurality of readers based upon a determined location of the device (110) within the secure area (240).

2. The system according to claim 1, wherein the reader transmits a message to said device.

3. The system according to claim 1, wherein the reader requests said id code from said device.

4. The system according to claim 1, wherein the device initiates transmission of said id code without receiving a request from the reader.

5. The system according to claim 1, wherein the device is a mobile telephone.

6. The system according to claim 1, wherein the device has a security module (114) for encrypting the id code.

7. The system according to claim 1, wherein the reader has a security module (142) for decrypting the id code.

8. The system according to claim 1, wherein the device communication interface includes one of IR (Infrared), Bluetooth® telecommunication services, 2.4 GHz Frequency (Unlicensed Frequency Band), and RFID/Stuart Card/Proximity Card Frequencies.

9. The system according to claim 1, wherein the reader communication interface includes one of IR (Infrared), Bluetooth® telecommunication services, 2.4 GHz Frequency (Unlicensed Frequency Band), and RFID/Smart Card/Proximity Card Frequencies.

10. The system according to claim 1, wherein if the id code is valid, the control panel performs an activity.

11. A security and asset management system (100) that controls access to a secure area (240) comprising:

a mobile telephone (110) having an id code (112), and a device communication interface (116) operable to initiate transmission of the id code (114) and to respond to a request for transmission of the id code (114);

a plurality of readers (140), each having a reader communication interface (144) operable to obtain the id code (112) from the mobile telephone (110) via a predetermined frequency band wherein mobile frequencies or cellular networks are not used for secure communications and wherein each of the plurality of readers is operable to determine a distance and direction of the mobile telephone (110) from the reader (140);

a control panel (170) operable to communicate with said at least one reader (140); and a memory (180) for storing location data (184) and ID data (182) separate from the control panel (170), the memory (180) including at least one or more id codes (112), said memory (180) accessible by said control panel (170), wherein the control panel (170) validates the id code (112) received from said reader (140), and the control panel (170) determines a device location (119) within a room or floor of the secured by coordinating the determined direction and distance of the mobile telephone (110) from the reader (140) with the location data (184) from the memory (180) wherein the control panel (170) permits entry by a user of the device (110) into the secure area (240) via any of the plurality of readers (140) based upon the validated id code (112) and determined location and sends messages to a user of the mobile telephone (110) during emergencies through one of the plurality of readers (140) based upon a determined location of the mobile telephone (110) within the secure area (240).

12. A method for identifying a device in a security and asset management system (100) of a secure area (240), comprising:

providing a plurality of readers (140) associated with the secure area;

transmitting an id code (112) from a device (110) via a predetermined frequency band wherein mobile frequencies or cellular networks are not used for secure communications;

receiving the id code (112) at a reader (140) of the plurality of readers (140) ;

the reader (140) determining a distance and direction of the device (110) from the reader (140) using a signal transmitted from the device (110) to the reader (140);

transmitting the id code (112) from the reader (140) to a control panel (170);

locating the device (110) within a room or floor of secure area (240) by coordinating the determined distance and direction of the device (110) from the reader (140) with location data (184) accessible by but separate from the control panel (170), wherein the control panel (170) validates the id code (112) using ID data (182), and if the id code (112) is valid, a user of the device (110) is authorized to enter the secure area; and transmitting messages to a user of the device (100) through one of the plurality of readers (140) based upon a determined location of the device (100) within the secure area (240).

13. The method according to claim 12, wherein the reader transmits a message to the device.

14. The method according to claim 12, wherein the id code is transmitted in response to a request from the reader.

15. The method according to claim 12, wherein the reader requests said id code.

16. The method according to claim 12, wherein the device is a mobile telephone.

17. The method according to claim 12, wherein the device has a security module (114) for encrypting the id code.

18. The method according to claim 12, wherein the reader has a security module (142) for decrypting the id code.

19. The method according to claim 12, wherein the device includes a communication interface selected from the group consisting of IR (Infrared), Bluetooth® telecommunication services, 2.4 GHz Frequency (Unlicensed Frequency Band), and RFID/Smart Card/Proximity Card Frequencies.

20. The method according to claim 12, wherein the reader includes comprises a reader communication interface selected from the group consisting of IR (Infrared), Bluetooth® telecommunication services, 2.4 GHz Frequency (Unlicensed Frequency Band), and RFID/Smart Card/Proximity Card Frequencies.

21. The method according to claim 12, further comprising the control panel performing an activity when the device is authorized.

* * * * *